(12) United States Patent
Olesen

(10) Patent No.: US 6,197,352 B1
(45) Date of Patent: Mar. 6, 2001

(54) ANTISTALING PROCESS AND AGENT

(75) Inventor: Tine Olesen, Hellerup (DK)

(73) Assignees: Novo Nordisk A/S; Novo Alle, both of Bagsvaerd (DK)

( * ) Notice: Subject to any disclaimer, the term of this patent is extended or adjusted under 35 U.S.C. 154(b) by 0 days.

(21) Appl. No.: 07/828,921

(22) PCT Filed: Sep. 26, 1990

(86) PCT No.: PCT/DK90/00244

§ 371 Date: Jan. 30, 1992

§ 102(e) Date: Jan. 30, 1992

(87) PCT Pub. No.: WO91/04669

PCT Pub. Date: Apr. 18, 1991

(30) Foreign Application Priority Data

Sep. 27, 1989 (DK) .................................................. 4745/89

(51) Int. Cl.[7] .................................................. A21D 2/00

(52) U.S. Cl. .............. 426/20; 426/61; 426/62; 426/63; 426/549

(58) Field of Search .............. 426/549, 20, 64, 426/19, 61, 62, 63

(56) References Cited

U.S. PATENT DOCUMENTS

| 4,598,048 | * | 7/1986 | Diderichsen | 435/172.3 |
| 4,604,355 | * | 8/1986 | Outtrup | 435/95 |
| 5,023,094 | * | 6/1991 | Van Eyk | 426/20 |
| 5,209,938 | * | 5/1993 | Kraus | 426/20 |

FOREIGN PATENT DOCUMENTS

| 62-79745 | * | 4/1987 | (JP) . |
| 62-79746 | * | 4/1987 | (JP) . |
| WO 89/08403 | * | 9/1989 | (WO) . |

OTHER PUBLICATIONS

Miller 1953 A Comparison of Cereal Fungal and Bacterial Alpha–Amylasea as Supplements for Breadmaking Food Technology, Jan. 1953 pp. 38–42.*

The American Heritage Dictionary 1982, Second College Edition p. 893, p. 1245.*

Outtrup 1984 Properties and Application of a Thermostable Maltogenic Amylase Produced by a Strain of Bacillus Modified by Recombinant—DNA Techniques Starke 36:12(5)405–411.*

Pyler, 1988 Baking Science & Technology, 3rd edition, vol. 1 Sosland Publishing Co., Kansas City MO pp. 30–32, 132–151.*

Waldt 1968 The Problem of Staling The Bakers Digest Oct. 1968, pp. 64–66, 73.*

* cited by examiner

Primary Examiner—Carolyn Paden
(74) Attorney, Agent, or Firm—Steve T. Zelson, Esq.; Elias Lambiris, Esq.

(57) ABSTRACT

The staling of leavened baked products such as bread is retarded by adding an enzyme with exoamylase activity to the flour or dough used for producing the baked product in question.

40 Claims, No Drawings

ANTISTALING PROCESS AND AGENT

FIELD OF INVENTION

The present invention relates to a process for retarding the staling of bread and similar baked products, as well as an agent for use in the process.

BACKGROUND OF THE INVENTION

Staling of baked products, principally bread, has been ascribed to certain properties of the starch component of flour. Starch is essentially composed of amylose forming the core of starch granules and amylopectin forming the outer "envelope" of starch granules. Starch suspensions have been observed to retrograde on standing to precipitate the amylose which, by some, has been given as the explanation of the phenomenon of staling. Others have explained staling of bread in terms of the amylopectin chains in starch associating to cause a greater rigidity of the bread crumb which is characteristic of stale bread.

It is generally recognized to be of some commercial importance to retard the staling of baked products so as to improve their shelf-life. Retardation of the staling process may, for instance, be brought about by the addition of monoglycerides to dough. The antistaling effect of the monoglycerides may partly be ascribed to their ability to bind water and partly to the formation of monoglyceride-amylose complexes wherein the long hydrocarbon chain penetrates into the cavity of the amylose helix and thereby stabilise the helical structure to prevent retrogradation.

Enzymatic retardation of staling by means of α-amylases has also been described, vide for instance U.S. Pat. No 2,615,810 and U.S. Pat. No. 3,026,205 as well as O. Silberstein, "Heat-Stable Bacterial Alpha-Amylase in Baking", *Baker's Digest* 38(4), August 1964, pp. 66–70 and 72. The use of α-amylase for retarding the staling of bread has, however, not become widespread. The reason for this is assumed to be that the medium-molecular weight branched compounds, termed maltodextrins (with 20–100 glucose units in the molecule), generated through the hydrolytic action of α-amylases have a sticky consistency in themselves resulting in the formation of a sticky or gummy crumb, and consequently an unacceptable mouthfeel, of the baked product if the α-amylase is overdosed so that the maltodextrins are present in excessive quantities.

It has previously been suggested to remedy the deleterious effects of very large doses of α-amylase added to dough by adding a debranching enzyme such as pullulanase, cf. U.S. Pat. No. 4,654,216, the contents of which are incorporated herein by reference. The theory behind the addition of a debranching enzyme to obtain an antistaling effect while concomitantly avoiding the risk of producing a gummy crumb in the resulting bread is that by cleaving off the branched chains of the dextrins generated by α-amylase hydrolysis which cannot be degraded further by the α-amylase, the starch is converted to oligosaccharides which do not cause gumminess.

SUMMARY OF THE INVENTION

The present invention represents a different approach to the problem of crumb gumminess likely to result from the excessive use of α-amylase for retarding the staling of bread. Thus, the present invention relies on the use of an enzyme which is capable of retarding the staling of baked products but which does not hydrolyze starch into the above-mentioned branched dextrins.

It has surprisingly been found that when the enzyme added to dough used for producing baked products is an exoamylase, an antistaling effect is obtained whereas the formation of a sticky or gummy crumb is substatially avoided except at very high levels of the enzyme which also give rise to other deleterious effects likely to be discovered when the baked products are subjected to quality control.

It was also found that by using exoamylase enzymes one avoids a certain softness and stickiness of the dough which is often encountered when α-amylases, especially fungal α-amylases, are used for antistaling, and especially if the α-amylase has been overdosed, even if only to a mild degree.

Accordingly, the present invention relates to a process for retarding the staling of leavened baked products, which process comprises adding an enzyme with exoamylase activity to flour or dough used for producing said baked products. In the following, this enzyme is usually referred to as an "exoamylase".

In another aspect, the present invention relates to a baked product produced by the present process.

It will often be advantageous to provide the exoamylase in admixture with other ingredients commonly used to improve the properties of baked products. These are commonly known as "pre-mixes" and are employed not only in industrial bread-baking plants/facilities, but also in retail bakeries where they are usually supplied in admixture with flour.

Hence, in a further aspect, the present invention relates to an agent for improving the quality of leavened, in particular yeast leavened, baked products, which agent comprises an enzyme with exoamylase activity in liquid or substantially dry form. For the present purpose, such an agent will be termed a "bread improver" in the following description although it will be understood that it may also be used for addition to other types of leavened baked products such as rolls, certain kinds of cakes, muffins, buns, etc.

DETAILED DISCLOSURE OF THE INVENTION

Exoamylases are enzymes which hydrolyse (1->4) α-glucosidic linkages in starch (and related polysaccharides) by removing mono- or oligosaccharide units from the non-reducing ends of the polysaccharide chains. The reducing groups liberated from the polysaccharide molecule may be in the α- or β-configuration. Examples of exoamylases which are useful for the present purpose are glucoamylase, β-amylase (which releases maltose in the β-configuration) and maltogenic amylase (which releases maltose in the α-configuration, but in contrast to α-amylases predominantly produces maltotriose and maltotetraose and only minor amounts of higher oligosaccharides). The antistaling effect of adding exoamylase to dough is currently believed to be ascribable to the formation of sugars with a high water retention capacity which makes the baked product in question appear fresh (soft) for longer periods of time (e.g. glucose, maltose, maltotriose and/or maltotetraose), as well as to the modification of the native starch which reduces the tendency to retrogradation. Overdosing with the exoamylase resulting in crumb stickiness is less likely to occur because the formation of branched maltodextrins with 20–100 glucose units to which the stickiness may be ascribed is, if not completely avoided, at least significantly lower than when using α-amylase.

The use of amylase (primarily α-amylase), invertase and poly-saccharidase, as well as glucosidase (an exoamylase)) is suggested in EP 136 158 and EP 136 159 for the preparation of cookies with a moist crumb structure. Amylase is capable of forming crystallization-resistant sugar, which is able to bind water, from one or more ingredients in the dough resulting in the aforementioned moist crumb when the dough is subsequently baked. The cookies are indicated to be storage-stable.

It appears that the selection of the enzyme according to EP 136 158 and EP 136 159 is made with the object of obtaining a moist crumb structure due to the formation of water-binding sugars from starch. With this end in view, pregelatinized starch is added to the dough to facilitate enzymatic hydrolysis into various sugar species. It further appears that the risk of obtaining a gummy crumb in the baked product through addition of too large an amount of a-amylase is not a problem to be avoided, but rather that moistness of the baked crumb is the end result which the inventions disclosed in the above-mentioned EP applications intend to achieve. In fact, α-amylase which is known to produce crumb gumminess in leavened bread even when added in relatively low quantities is the preferred enzyme according to EP 136 159, the branched maltodextrins produced by the α-amylase apparently providing satisfactory moisture characteristics to the cookies produced.

Contrary to this, the object of the present invention is to avoid a sticky or gummy crumb in the baked product. The principal difference between the baked products disclosed in the EP applications and those produced by the present process resides chiefly in the type of dough used to make the respective products. The products made by the present process are leavened which implies that the gluten in the dough which is composed of layers of protein "sheets" joined to bimolecular layers of lipo- and phospholipoproteins is expanded by the carbon dioxide produced by the leavening agent (e.g. yeast) into a thin film which coagulates to a firm structure on heating. Starch serves to make the structure firmer as, on heating, it solidifies within the gluten structure. Thus, when preparing leavened baked products including an amylase enzyme to provide the antistaling effect, care must be taken to select one which results in a hydrolysis product with a good water retention capacity (e.g. maltose, maltotriose and/or maltotetraose) and sufficient modification of the amylase and amylopectin to retard retrogradation so as to provide a longer-lasting softness of the baked product, without, however, excessively affecting the structure of the native starch. This seems to generate a hydrolysis product with a sticky consistency (e.g. the branched maltodextrins with 20–100 glucose units produced by α-amylase) which would tend to impair this structure.

Consistent with the explanation given above, a preferred exoamylase for use in the present process is one which exhibits exoamylase activity at and above the gelation temperature of starch (i.e. about 60–70° C.), as it has been found that the retrogradation of starch and consequently the precipitation of amylose responsible for staling takes place at this temperature. Another reason is that starch hydrolysis is facilitated when the starch is gelatinized such that the swelling of the starch granules caused by their uptake of liquid (water) liberated by the coagulation of gluten loosens the normally tight structure of the starch granules to make them more accessible to enzyme activity. This leads to a hydrolysis of the starch which is sufficient to retard retrogradation and to form adequate amounts of sugar without excessively modifying the native starch, resulting in an improved water retention. Contrary to such a heat-stable exoamylase, cereal β-amylases inherently present in flour exhibit little starch hydrolytic activity in the process of baking as they are inactive at the gelation temperature of starch. It should be noted that the exoamylases will be inactivated later in the baking process, at temperatures above about 90° C. so that substantially no residual exoamylase activity remains in the baked bread.

Preferred exoamylase enzymes are microbial exoamylases as these are easier to produce on a large scale than exoamylases of, for instance, plant origin. An example of a suitable exoamylase is a maltogenic amylase producible by Bacillus strain NCIB 11837, or one encoded by a DNA sequence derived from Bacillus strain NCIB 11837 (the maltogenic amylase is disclosed in U.S. Pat. No. 4,598,048 and U.S. Pat. No 4,604,355, the contents of which are incorporated herein by reference) This maltogenic amylase is capable of hydrolyzing 1,4-α-glucosidic linkages in starch, partially hydrolyzed starch and oligosaccharides (e.g. maltotriose). Maltose units are removed from the non-reducing chain ends in a stepwise manner. The maltose released is in the α-configuration. In the U.S. Patents mentioned above, the maltogenic amylase is indicated to be useful for the production of maltose syrup of a high purity. Another maltogenic amylase which may be used in the present process is a maltogenic β-amylase producible by Bacillus strain NCIB 11608 (disclosed in EP 234 858, the contents of which are hereby incorporated by reference).

For the present purpose, this maltogenic amylase may be added to flour or dough in an amount of 0.1–10,000 MANU, preferably 1–5000 MANU, more preferably 5–2000 MANU, and most preferably 10–1000 MANU, per kg of flour. One MANU (Maltogenic Amylase Novo Unit) may be defined as the amount of enzyme required to release one $\mu$mol of maltose per minute at a concentration of 10 mg of maltotriose (Sigma M 8378) substrate per ml of 0.1 M citrate buffer, pH 5.0 at 37° C. for 30 minutes.

The dough may be leavened in various ways such as by adding sodium bicarbonate or the like or by adding a leaven (fermenting dough), but it is preferred to leaven the dough by adding a suitable yeast culture such as a culture of *Saccharomyces cerevisiae* (baker's yeast). Any one of the commercially available *S. cerevisiae* strains may be employed.

The baked product is generally one made from, or at least containing a certain amount of, wheat flour as such baked products are more susceptible to staling than products made from, for instance, rye flour due to their airier structure. Thus, the baked product may be selected from the group consisting of white bread, whole-meal bread, and bread prepared from mixtures of wheat and rye flour. Of course rolls or the like made from the same type of dough are also included in this definition.

In the present process, the exoamylase enzyme may be added to the dough in the form of a liquid, in particular a stabilized liquid, or it may be added to flour or dough as a substantially dry powder or granulate. Granulates may be produced, e.g. as disclosed in U.S. Pat. No. 4,106,991 and U.S. Pat. No. 4,661,452. Liquid enzyme preparations may, for instance, be stabilized by adding a sugar or sugar alcohol or lactic acid according to established procedures. Other enzyme stablilizers are well-known in the art.

In accordance with established practice in the baking art, one or more other enzymes may be added to the flour or dough. Examples of such enzymes are a-amylase (useful for providing sugars fermentable by yeast although it should only be added in limited quantities, for the reasons given above), pentosanase (useful for the partial hydrolysis of pentosans which increases the extensibility of the dough) or a protease (useful for gluten weakening, in particular when using hard wheat flour).

Also in accordance with established baking practice, one or more emulsifiers may be added to the flour or dough. Emulsifiers serve to improve dough extensibility and may also be of some value for the consistency of the resulting bread, making it easier to slice, as well as for its storage stability, as explained above. Examples of suitable emulsifiers are mono- or diglycerides, polyoxyethylene stearates, diacetyl tartaric acid esters of monoglycerides, sugar esters of fatty acids, propylene glycol esters of fatty acids, polyglycerol esters of fatty acids, lactic acid esters of monoglycerides, acetic acid esters of monoglycerides, lecithin or phospholipids.

When the bread improver of the invention is provided as a substantially dry formulation, it will typically contain the exoamylase in substantially dry form. The enzyme may thus be in the form of a solid powder or granulate which may be prepared in a manner known per se as indicated above. The term "substantially dry formulation" should, in the present context, be understood to mean that the formulation should appear as a dry and free-flowing powder and that the moisture content of the bread improver formulation should not exceed about 15%, and preferably not exceed about 10%. When the bread improver is in the form of a semi-liquid preparation, the enzyme may also be incorporated in liquid form.

Apart from the exoamylase, the bread improver of the invention may typically comprise one or more components selected from the group consisting of milk powder (providing crust colour), gluten (to improve the gas retention power of weak flours), an emulsifier (such as one of those mentioned above), granulated fat (for dough softening and consistency of bread), an oxidant (added to strengthen the gluten structure; e.g. ascorbic acid, potassium bromate, potassium iodate or ammonium persulfate), another enzyme (e.g. α-amylase, pentosanase or a protease as explained above), an amino acid (e.g. cysteine) and salt (e.g. sodium chloride, calcium acetate, sodium sulfate or calcium sulfate serving to make the dough firmer).

It is at present contemplated that the exoamylase may be present in the bread improver in an amount of 1–5,000,000 MANU (as defined above) per kg of the bread improver, preferably 10–2,500,000 MANU, more preferably 50–1,000,000 MANU, most preferably 100–500,000 MANU, and in particular 1000–100,000 MANU of the exoamylase per kg of the bread improver. In accordance with conventional practice for the use of bread improvers, this may be added to flour in an amount of 0.2–10%, in particular 0.5–5%, by weight of the flour.

The present invention is further illustrated in the following example which is not in any way intended to limit the scope and spirit of the invention.

EXAMPLE

White pan bread was prepared from the following ingredients

| Wheat flour* | 100% |
|---|---|
| Water | 52% |
| Sodium chloride | 2% |
| Baker's yeast | 2.5% |

*)commercial wheat flour of moderate quality (treated with ascorbic acid): ≈11% protein, ≈15% humidity by mixing with a spiral mixer for 4 minutes at 140 rpm and for 3 minutes at 280 rpm (Speed of the spiral rotor). The dough temperature was 26° C. The dough was allowed to rise for 40 minutes at 34° C. and, after degassing and moulding, for 65 minutes at 34° C. The bread was subsequently baked for 30 minutes at 230° C.

To the dough ingredients were added varying amounts of NOVAMYL™ (a recombinant maltogenic amylase encoded by a DNA sequence derived from Bacillus strain NCIB 11837, described in U.S. Pat. No. 4,598,048), Fungamyl 1600 S (a commercial α-amylase available from Novo-Nordisk a/s) and Veron F25 (a commercial α-amylase available from Rohm), respectively. The results appear from the following tables.

TABLE 1

NOVAMYL™, 1500 MANU/g

| | Dosage in g/100 kg of flour | | | | | |
|---|---|---|---|---|---|---|
| Properties | 0 | 6.7 | 13.3 | 27 | 53 | 107 |
| Dough | short structure | short structure | short structure | short structure | short structure | short structure |
| Volume index | 100 | 99 | 99 | 100 | 100 | 101 |
| Crumb structure | fine | fine | fine | | | coarser |
| Crumb freshness (48 h) | 100 | 240 | 270 | 280 | 310 | 310 |
| Crumb freshness (72 h) | 100 | 160 | 200 | 230 | 270 | 270 |
| Crumb freshness (96 h) | 100 | 160 | 390 | 425 | 500 | 580 |
| Gummy crumb | no | no | no | no | no | yes |

TABLE 2

Fungamyl™ 1600 S

| | Dosage in g/100 kg of flour | | | | | |
|---|---|---|---|---|---|---|
| Properties | 0 | 10 | 20 | 40 | 80 | 160 |
| Dough | short structure | pos. | pos. | dough too soft | dough too soft | dough too soft |
| Volume index | 100 | 102 | 107 | 107 | 106 | 106 |
| Crumb structure | fine ripe | fine/ ripe | fine/ | | | coarser |
| Crumb freshness (48 h) | 100 | 240 | 280 | 290 | 330 | 320 |
| Crumb freshness (72 h) | 100 | 145 | 240 | 230 | 280 | 290 |
| Crumb freshness (96 h) | 100 | 200 | 250 | 530 | 650 | 675 |
| Gummy crumb | no | no | no | no/yes | yes | yes |

TABLE 3

Veron F25

Dosage in g/100 kg of flour

| Properties | 0 | 10 | 20 | 40 | 80 | 106 |
|---|---|---|---|---|---|---|
| Dough | short structure | pos. | pos. | pos. | pos. | pos. |
| Volume index | 100 | 100 | 100 | 102 | 102 | 102 |
| Crumb structure | fine | fine | fine | | | coarser |
| Crumb freshness (48 h) | 100 | 210 | 210 | 210 | 235 | 210 |
| Crumb freshness (72 h) | 100 | 125 | 125 | | | 230 |
| Crumb freshness (96 h) | | | | | | |
| Gummy crumb | no | no | no | no/yes | yes | yes |

It appears from the tables above that, compared to the use of Fungamyl 1600 S and Veron F25, the addition of NOVAMYL™ to dough leads to improved storage properties of the resulting bread without a concomitant gumminess of the crumb which only occurs a far larger dosage of the enzyme. NOVAMYL™ does not significantly change other dough or bread characteristics.

What is claimed is:

1. A process for retarding the staling of a baked product comprising
   (a) adding a maltogenic α-amylase to either a flour that is then used to form a dough or directly to a dough wherein the maltogenic α-amylase is produced by Bacillus strain NCIB 11837 or is encoded by a DNA sequence derived from Bacillus strain NCIB 11837 and is added in an amount to retard the staling of the baked product; and
   (b) baking the dough to form the baked product.

2. The process of claim 1, wherein the amount is from 0.1 to 10,000 MANU per kg of flour.

3. The process of claim 2, wherein the amount is from 1 to 5000 MANU per kg of flour.

4. The process of claim 3, wherein the amount is from 5 to 2000 MANU per kg of flour.

5. The process of claim 4, wherein the amount is from 10 to 1000 MANU per kg of flour.

6. The process of claim 1, further comprising adding a yeast culture to the dough.

7. The process of claim 1, wherein the baked product is bread.

8. The process of claim 7, wherein the baked product is white bread, whole-meal bread, or bread produced from mixtures of wheat and rye flour.

9. The process of claim 8, wherein the baked product is white bread.

10. The process of claim 1, wherein the baked product is made from or contains wheat flour.

11. The process of claim 1, further comprising adding one or more other enzymes to the flour or dough.

12. The process of claim 11, wherein the other enzyme(s) is/are α-amylase, pentosanase or a protease.

13. The process of claim 1, further comprising adding one or more emulsifiers to the flour or dough.

14. The process of claim 13, wherein the emulsifier(s) is/are mono- or diglycerides, polyoxyethylene stearates, diacetyl tartaric acid esters of monoglycerides, sugar esters of fatty acids, propylene glycol esters of fatty acids, polyglycerol esters of fatty acids, lactic acid esters of monoglycerides, acetic acid esters of monoglycerides, lecithin or phospholipids.

15. A baked product produced by the process of claim 11.

16. A process for producing a baked product comprising
   (a) adding a maltogenic α-amylase to a flour wherein the maltogenic α-amylase is produced by Bacillus strain NCIB 11837 or is encoded by a DNA sequence derived from Bacillus strain NCIB 11837;
   (b) preparing a dough from the flour; and
   (c) baking the dough to form the baked product.

17. The process of claim 16, wherein the baked product is bread.

18. The process of claim 17, wherein the baked product is white bread, whole-meal bread, or bread produced from mixtures of wheat and rye flour.

19. The process of claim 18, wherein the baked product is white bread.

20. The process of claim 16, wherein the baked product is made from or contains wheat flour.

21. A baked product produced by the process of claim 16.

22. A process for producing a baked product comprising
   (a) adding a maltogenic α-amylase to a dough wherein the maltogenic α-amylase is produced by Bacillus strain NCIB 11837 or is encoded by a DNA sequence derived from Bacillus strain NCIB 11837; and
   (b) baking the dough to form the baked product.

23. The process of claim 22, wherein the baked product is bread.

24. The process of claim 23, wherein the baked product is white bread, whole-meal bread, or bread produced from mixtures of wheat and rye flour.

25. The process of claim 24, wherein the baked product is white bread.

26. The process of claim 22, wherein the baked product is made from or contains wheat flour.

27. A baked product produced by the process of claim 22.

28. In a process for producing a baked product, the improvement comprising incorporating a maltogenic α-amylase to an ingredient used for producing the baked product, wherein the maltogenic α-amylase is produced by Bacillus strain NCIB 11837 or is encoded by a DNA sequence derived from Bacillus strain NCIB 11837.

29. The process of claim 28, wherein the baked product is bread.

30. The process of claim 29, wherein the baked product is white bread, whole-meal bread, or bread produced from mixtures of wheat and rye flour.

31. The process of claim 30, wherein the baked product is white bread.

32. The process of claim 28, wherein the baked product is made from or contains wheat flour.

33. A baked product produced by the process of claim 28.

34. A composition, comprising (a) a maltogenic α-amylase produced by Bacillus strain NCIB 11837 or is encoded by a DNA sequence derived from Bacillus strain NCIB 11837 and (b) one or more components selected from the group consisting of milk powder, gluten, an emulsifier, granulated fat, an oxidant, another enzyme, an amino acid and a salt.

35. The composition of claim 34, wherein the maltogenic α-amylase is in liquid form.

36. The composition of claim 34, wherein the maltogenic α-amylase is in dry form.

37. The composition of claim 34, wherein the oxidant is ascorbic acid, potassium bromate, potassium iodate or ammonium persulfate.

38. The composition of claim 34, wherein the other enzyme is α-amylase, pentosanase or a protease.

39. The composition of claim 34, wherein the amino acid is cysteine.

40. The composition of claim 34, wherein the salt is sodium chloride, calcium acetate, sodium sulfate or calcium sulfate.

* * * * *